Figure 1:
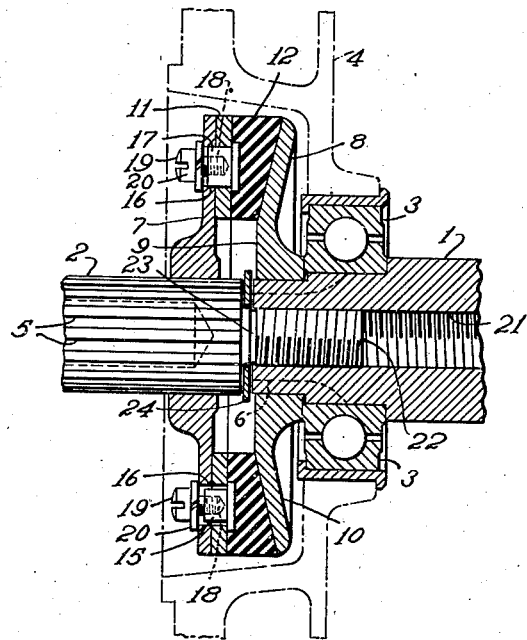

Oct. 24, 1944.　　J. D. MINER, JR., ET AL　　2,361,226
RESILIENT SHAFT COUPLING
Filed April 1, 1942

WITNESSES:
Edward Michaels
F. P. Lyle

INVENTORS
John D. Miner Jr. and
Joseph E. Mulheim.
BY O. B. Buchanan
ATTORNEY

Patented Oct. 24, 1944

2,361,226

UNITED STATES PATENT OFFICE 2,361,226

RESILIENT SHAFT COUPLING

John D. Miner, Jr., and Joseph E. Mulheim, Lima, Ohio, assignors to Westinghouse Electric & Manufacturing Company, East Pittsburgh, Pa., a corporation of Pennsylvania Application April 1, 1942, Serial No. 437,216

9 Claims. (Cl. 64—27)

The present invention relates to shaft couplings and, more particularly, to a resilient coupling of compact design and low weight.

The coupling of the present invention is especially adapted for connecting the shaft of an aircraft generator to the drive shaft by which it is driven from the engine, although its usefulness is not necessarily restricted to this particular application. Generators used on airplanes are driven through gears from the airplane engine, and if a rigid coupling were used to connect the generator shaft to the drive shaft, the inertia of the generator rotor would cause undesirable shock on the driving gears in case of rapid acceleration of the engine. The normal torsional oscillation of the shaft resulting from the pulsating torque of an internal combustion engine would also cause a similar effect. For this reason, it is necessary to provide a flexible or resilient coupling between the drive shaft and the generator shaft to absorb these shocks and thus prevent possible damage to the gears and excessive wear on them. Couplings for this service must also occupy a minimum of space and be of minimum weight, and they must be highly reliable, since failure of the coupling, with resultant stopping of the generator, might have serious consequences. The design of a suitable coupling for aircraft generators, therefore, presents a rather difficult problem because of these exacting requirements.

The principal object of the present invention is to provide a resilient shaft coupling of compact construction which occupies a relatively small space and which is of low weight.

Another object of the invention is to provide a resilient shaft coupling of simple construction which has a small number of parts and which is easily assembled.

A further object of the invention is to provide a resilient shaft coupling for aircraft generators which is of highly reliable construction and which is so designed that, in case of failure of the resilient driving connection, a direct drive connection is provided, thus insuring continued operation of the generator.

A still further object of the invention is to provide a resilient shaft coupling for aircraft generators which is designed to rupture, in case of jamming of the generator armature, to interrupt the drive connection and thus prevent damage to the driving gears.

Figure 2:
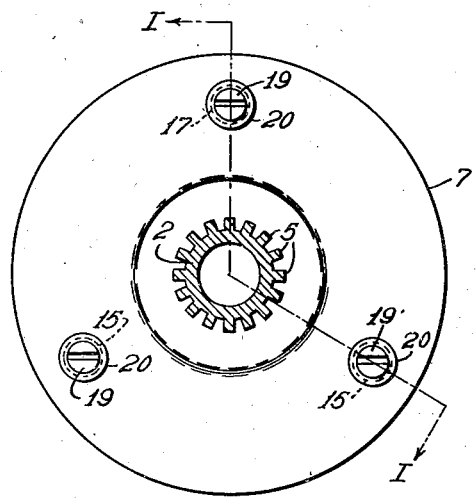

Other objects and advantages of the invention will be apparent from the following detailed description, taken in connection with the accompanying drawing, in which:

Figure 1 is a longitudinal sectional view of the shaft coupling of the present invention approximately on the line I—I of Fig. 2; and Fig. 2 is an end elevation, partly in section, seen from the left of Fig. 1.

The resilient coupling of the present invention, as explained above, is intended for use with aircraft generators, and is shown on the drawing connecting the armature shaft 1 of such a generator with its drive shaft 2. The armature shaft 1 is supported in a ball bearing 3 in the end bracket 4 of the generator. The end bracket 4 may be of any suitable construction and has not been shown in detail, since it forms no part of the present invention. The drive shaft 2 is provided with splines 5, and is adapted to be driven from the engine of the airplane by means of a gear train through a splined connection with the driving gears. The generator shaft 1 also has similar splines cut in its end, as indicated at 6.

The coupling itself consists of a coupling plate 7, mounted on the driving shaft 2, and a coupling plate 8, mounted on the driven or generator shaft 1. The coupling plate 8 has a hub portion 9 which is internally splined to fit on the splined end of the generator shaft 1 so as to provide a driving connection between the coupling plate and the shaft. The coupling plate 8 also has a conical flange portion 10 through which it is driven by means of a resilient connection. To effect the resilient drive connection, an annular metal ring 11 is provided, and this ring is joined to the coupling plate 8 by means of a mass of resilient material 12, which fills the space between the ring 11 and coupling plate 8 and secures them together. The resilient material 12 may be either natural or synthetic rubber, or other suitable material, and it is bonded to both the ring 11 and the plate 8 to form a resilient connection between them. The ring 11 carries a plurality of pins 15 and 17 extending axially from it. Three pins are utilized in the embodiment of the invention shown in the drawing, but any suitable number may be used. These pins are preferably inserted through holes in the ring 11 before the resilient material 12 is bonded to it, so that in the bonding operation the rubber 12 is bonded to the pins as well as to the ring, thus insuring firm attachment of the pins. It will be apparent, however, that the pins might be secured to the ring in any other suitable manner.

The coupling plate 7 is also internally splined and is mounted on the driving shaft 2. The splined connection provides a rigid driving connection between the shaft and the plate, but permits axial movement of the plate to facilitate assembly of the coupling. The plate 7 has a plurality of holes 16 in it corresponding in number and position to the pins 15 and 17, and the pins extend into the holes 16. One pin 17 is preferably made slightly larger in diameter than the other pins 15, so that when the coupling is assembled, the pin 17 has a tight fit in the corresponding hole 16 to effect a driving connection between the two coupling plates 7 and 8. The other pins 15 fit relatively loosely in the holes 16, and function as guiding means to facilitate assembly of the coupling by accurately locating the coupling plates 7 and 8 in the proper position with respect to each other. In normal operation of the coupling, the entire load is transmitted by the pin 17 through its driving connection with the plate 7. It will be understood, of course, that all of the pins might be made of the same size and the load transmitted by all pins, but the construction described is preferred because of the greater ease of assembly. Each of the pins 15 and 17 has an internally threaded hole 18 in it, and after assembly of the coupling, screws 19 are inserted in these holes and held in position by lock washers 20. The screws 19 have no driving function but serve to prevent axial separation of the plates 7 and 8.

The generator shaft 1 is preferably hollow, as shown in the drawing, although, if desired, the hollow may extend for only a short distance at the end of the shaft, and it is internally threaded as indicated at 21. The driving shaft 2 has an extending end portion 22 of reduced diameter which is externally threaded to engage the internal threads 21 of the generator shaft 1. The threads are preferably, but not necessarily, made of the same hand as the intended direction of rotation of the shafts 1 and 2. The extending end portion 22 of the drive shaft 2 also has an annular groove 23 cut in it to provide a weakened section which is adapted to rupture when a predetermined torque is applied to the shaft.

In assembling the coupling, the plate 8 is placed on the shaft 1, a washer 24 is placed over the end portion 22 of the drive shaft 2, and the end portion 22 is then screwed into the hollow drive shaft 1. The drive shaft 2 is screwed into the shaft 1 until the washer 24 is almost, but not quite, clamped between the adjacent ends of the two shafts. The washer 24 thus prevents substantial axial movement of the coupling plate 8, which is splined on the generator shaft 1, and since the threaded connection between the two shafts is not quite tightened up, it does not effect a driving connection between them. The coupling plate 7 is then placed on the shaft 2, and the pins 15 and 17 are engaged in the corresponding holes 16 in the plate 7, after which the screws 19 and lock washers 20 are put in place to hold the coupling plates together.

In the normal operation of the coupling, the threaded connection between the generator shaft 1 and the end portion 22 of the drive shaft 2 does not have any driving function, since the threaded connection is not tightened, and, in fact, the threads are preferably made loose enough to permit a certain amount of misalignment between the two shafts. The threaded engagement between the shafts does, however, effect a certain amount of additional frictional damping for the resilient connection 12 between the coupling plates, and at the same time it permits the necessary relative torsional movement between the two shafts. In normal operation, the entire drive connection between the two shafts is effected through the coupling plate 7, the one pin 17, ring 11, resilient connection 12, and coupling plate 8, so that a resilient drive is provided which absorbs torsional vibration and which prevents shock to the driving gears by permitting the necessary amount of relative torsional movement between the two shafts.

In case the resilient connection 12 should fail, either by failure of the bond between the mass of rubber, and either the plate 8 or the ring 11, or by shearing of the rubber 12, the resilient driving connection will be broken. If this occurs, however, the drive shaft 2 continues to rotate and the threaded end portion 22 is screwed further into the generator shaft 1, since the threads are preferably of the same hand as the direction of rotation. Thus, the threaded connection between the two shafts is tightened up until the washer 24 is tightly clamped between the two shafts and a rigid direct drive connection is effected which keeps the generator in operation in spite of the failure of the resilient drive connection 12. Such a direct drive, of course, is not desirable as a permanent construction, but it is permissible for a short time, and insures the continued operation of the generator in spite of failure of the resilient coupling until such time as repairs can be made.

It may occasionally happen that the generator armature jams or sticks because of failure of a bearing, or for some other reason, and such jamming might easily result in serious damage to the driving gears if the coupling continued to connect the drive shaft to the generator shaft. With the coupling of the present invention, however, this danger is eliminated, since if the generator armature jams and cannot be rotated, the drive shaft 2 will be screwed further into the hollow shaft 1 until the threaded connection tightens up, and the end portion 22 will be sheared off at the weakened section 23, which is designed to shear at a predetermined excess torque, in order to protect the driving gears. The resilient connection 12 is also designed to shear at approximately the same excess torque, so that the drive connection is completely interrupted between the two shafts, and the coupling thus permits the drive shaft 2 to continue to rotate without any danger of damage to the driving gears.

It should now be apparent, therefore, that a flexible or resilient coupling has been provided which is especially well adapted for use in driving generators on airplanes. This coupling meets the rather exacting requirements of this service very well, since it is of compact design, requiring only a few parts, and can be made of very light weight. The assembly of the coupling is very easy, being facilitated in the preferred construction by the use of the pins 15, which serve as locating means, and requiring only one tight fit, between the pin 17 and the plate 7, which provides the normal drive connection. The coupling has great reliability, since it is so designed that there is little danger of failure of the resilient connection, but in case the resilient drive connection should fail for any reason, a rigid and positive drive is immediately provided which keeps the generator operating until such time as repairs can be made. The coupling also provides the additional safety feature that, in case the generator armature should jam, the coupling will rupture and prevent damage to the driving gears. These are all important advantages of the new coupling which make it very well adapted for the exacting service for which it is intended, although it will be apparent that these features are also desirable in other classes of service, and that the coupling is not restricted merely to use with aircraft generators, but may also be used in many other applications.

It is to be understood that the invention is capable of various modifications. Thus, the threads which connect the two shafts may be of either hand, although they are preferably of the same hand as the direction of rotation. The coupling plates may be made of any desired shape, and any other suitable means may be used in place of the screws 19 to prevent axial separation of the plates. Thus, various modifications are possible, and it is to be understood that the invention is not limited to the exact details of construction shown and described for the purpose of illustration, but in its broadest aspect it includes all equivalent modifications and embodiments which come within the scope of the appended claims.

We claim as our invention:

1. A shaft coupling for transmitting power between a driving shaft and a driven shaft, said coupling comprising a first coupling plate mounted on said driving shaft, a second coupling plate mounted on said driven shaft, an annular ring, a mass of resilient material bonded to said ring and to said second coupling plate for resiliently securing the ring to the plate, a plurality of pins secured in said ring and extending axially therefrom, at least one of said pins engaging tightly in a hole in said first coupling plate to effect a driving connection between said coupling plates, one of said shafts having an internally threaded hollow therein, and the other of said shafts having an end portion extending into said hollow, said end portion having external threads thereon cooperating with said internal threads, the engagement between said internal and external threads being sufficiently loose so that it does not constitute a driving connection during normal operation of the coupling, and means for preventing axial separation of said coupling plates.

2. A shaft coupling for transmitting power between a driving shaft and a driven shaft, said coupling comprising a first coupling plate mounted on said driving shaft, a second coupling plate mounted on said driven shaft, an annular ring, a mass of resilient material bonded to said ring and to said second coupling plate for resiliently securing the ring to the plate, a plurality of pins secured in said ring and extending axially therefrom, at least one of said pins engaging tightly in a hole in said first coupling plate to effect a driving connection between said coupling plates, said driven shaft having an internally threaded hollow therein, and said driving shaft having an end portion extending into said hollow, said end portion having external threads thereon cooperating with said internal threads, the engagement between said internal and external threads being sufficiently loose so that it does not constitute a driving connection during normal operation of the coupling, and means for preventing axial separation of said coupling plates.

3. A shaft coupling for transmitting power between a driving shaft and a driven shaft, said coupling comprising a first coupling plate mounted on said driving shaft, a second coupling plate mounted on said driven shaft, an annular ring, a mass of resilient material bonded to said ring and to said second coupling plate for resiliently securing the ring to the plate, a plurality of pins secured in said ring and extending axially therefrom, at least one of said pins engaging tightly in a hole in said first coupling plate to effect a driving connection between said coupling plates, said driven shaft having an internally threaded hollow therein, and said driving shaft having an externally threaded end portion of reduced diameter, said end portion being screwed into said hollow but not tightened therein, and means for preventing axial separation of said coupling plates.

4. A shaft coupling for transmitting power between a driving shaft and a driven shaft, said coupling comprising a first coupling plate mounted on said driving shaft, a second coupling plate mounted on said driven shaft, an annular ring, a mass of resilient material bonded to said ring and to said second coupling plate for resiliently securing the ring to the plate, a plurality of pins secured in said ring and extending axially therefrom, at least one of said pins engaging tightly in a hole in said first coupling plate to effect a driving connection between said coupling plates, one of said shafts having an internally threaded hollow therein, and the other of said shafts having an end portion extending into said hollow, said end portion having external threads thereon cooperating with said internal threads, the engagement between said internal and external threads being sufficiently loose so that it does not constitute a driving connection during normal operation of the coupling, said end portion having a weakened section which is adapted to rupture when a predetermined excess torque is applied to it, and means for preventing axial separation of said coupling plates.

5. A shaft coupling for transmitting power between a driving shaft and a driven shaft, said coupling comprising a first coupling plate mounted on said driving shaft, a second coupling plate mounted on said driven shaft, an annular ring, a mass of resilient material bonded to said ring and to said second coupling plate for resiliently securing the ring to the plate, a plurality of pins secured in said ring and extending axially therefrom, at least one of said pins engaging tightly in a hole in said first coupling plate to effect a driving connection between said coupling plates, said driven shaft having an internally threaded hollow therein, and said driving shaft having an externally threaded end portion of reduced diameter, said end portion being screwed into said hollow but not tightened therein, said end portion having a weakened section which is adapted to rupture when a predetermined excess torque is applied to it, and means for preventing axial separation of said coupling plates.

6. A shaft coupling for connecting a driving shaft and a driven shaft, said coupling comprising a first coupling plate mounted on said driving shaft to be driven thereby, a second coupling plate mounted on said driven shaft, means for effecting a resilient driving connection between said coupling plates, interengaging means on said driving and driven shafts, said interengaging means being normally in frictional contact but with sufficient looseness so as not to constitute a driving engagement and being adapted to effect a direct driving connection between said shafts in the event of failure of said resilient driving connection.

7. A shaft coupling for connecting a driving shaft and a driven shaft, said coupling comprising a first coupling plate mounted on said driving shaft to be driven thereby, a second coupling plate mounted on said driven shaft, means for effecting a resilient driving connection between said coupling plates, one of said shafts having an internally threaded hollow therein, and the other of said shafts having an end portion extending into said hollow, said end portion having external threads thereon cooperating with said internal threads, the engagement between said internal and external threads being sufficiently loose so that it does not constitute a driving connection during normal operation of the coupling, and means for preventing axial separation of said coupling plates.

8. A shaft coupling for connecting a driving shaft and a driven shaft, said coupling comprising a first coupling plate mounted on said driving shaft to be driven thereby, a second coupling plate mounted on said driven shaft, means for effecting a resilient driving connection between said coupling plates, said driven shaft having an internally threaded hollow therein, and said driving shaft having an end portion extending into said hollow, said end portion having external threads thereon cooperating with said internal threads, the engagement between said internal and external threads being sufficiently loose so that it does not constitute a driving connection during normal operation of the coupling, and means for preventing axial separation of said coupling plates.

9. A shaft coupling for connecting a driving shaft and a driven shaft, said coupling comprising a first coupling plate mounted on said driving shaft to be driven thereby, a second coupling plate slidably but non-rotatably mounted on said driven shaft to drive the driven shaft, means for effecting a resilient driving connection between said coupling plates, said driven shaft having an internally threaded hollow therein, said driving shaft having an end portion of reduced diameter extending into the hollow of the driven shaft, said end portion having threads thereon cooperating with the threads of the driven shaft, the threaded engagement between said shafts being sufficiently loose so that it does not constitute a driving connection during normal operation of the coupling, and a retainer member supported on said reduced end portion of the driving shaft between the adjacent ends of the shafts and held in position by the threaded engagement of the shafts, said retainer member preventing axial movement of said second coupling plate.

JOSEPH E. MULHEIM.
JOHN D. MINER, Jr.